(12) United States Patent
Kamada et al.

(10) Patent No.: US 7,473,198 B2
(45) Date of Patent: Jan. 6, 2009

(54) APPARATUS FOR CONNECTING BICYCLE CHAIN LINKS TOGETHER

(75) Inventors: Kenji Kamada, Abeno (JP); Toshinari Oishi, Sakai (JP); Shingo Numata, Sakai (JP); Takao Harada, Sakai (JP); Nobutaka Masaoka, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 0 days.

(21) Appl. No.: 10/908,011

(22) Filed: Apr. 25, 2005

(65) Prior Publication Data

US 2005/0266949 A1 Dec. 1, 2005

(30) Foreign Application Priority Data

Jun. 1, 2004 (JP) .............................. 2004-163298

(51) Int. Cl.
*F16G 13/06* (2006.01)
(52) U.S. Cl. ........................ 474/230; 474/231
(58) Field of Classification Search ................. 474/230, 474/231, 234, 228; 59/223, 84, 78, 900, 59/5

See application file for complete search history.

(56) References Cited

U.S. PATENT DOCUMENTS

| | | | | |
|---|---|---|---|---|
| 2,773,971 A | * | 12/1956 | Teerlink .................. | 219/150 V |
| 4,050,323 A | * | 9/1977 | I'Anson ...................... | 198/853 |
| 4,464,151 A | * | 8/1984 | Kahl ........................... | 474/231 |
| 4,978,327 A | * | 12/1990 | Wu .............................. | 474/228 |
| 5,437,148 A | * | 8/1995 | Karp ............................. | 59/78 |
| 5,465,568 A | | 11/1995 | Wang | |
| 5,809,767 A | * | 9/1998 | Tanaka ............................ | 59/5 |
| 5,921,880 A | * | 7/1999 | Ishimoto et al. ............. | 474/207 |
| 6,394,923 B1 | * | 5/2002 | Huang ......................... | 474/231 |
| 2002/0010047 A1 | * | 1/2002 | Kurokawa et al. .......... | 474/231 |
| 2002/0173395 A1 | * | 11/2002 | Reiter et al. ................. | 474/231 |
| 2004/0171450 A1 | * | 9/2004 | Kaga et al. .................. | 474/231 |

FOREIGN PATENT DOCUMENTS

| | | |
|---|---|---|
| GB | 2257221 A | 1/1993 |
| GB | 2260592 A * | 4/1993 |
| JP | 4-41039 A | 2/1992 |

\* cited by examiner

*Primary Examiner*—Richard W Ridley
*Assistant Examiner*—Terence Boes
(74) *Attorney, Agent, or Firm*—James A. Deland (57) ABSTRACT

A bicycle chain connecting pin comprises a pin body dimensioned to fit within an opening in a link plate of a bicycle chain, wherein the pin body has an intermediate part and first and second ends. At least one of the first and second ends has a corresponding first or second recess defining a floor that faces in a longitudinal direction of the pin away from the pin. The floor has a floor diameter of from approximately 60% to approximately 90% of an outer diameter of the intermediate part.

13 Claims, 7 Drawing Sheets

APPARATUS FOR CONNECTING BICYCLE CHAIN LINKS TOGETHER

BACKGROUND OF THE INVENTION

The present invention is directed to bicycles and, more particularly, to an apparatus for connecting bicycle chain links together.

Bicycle chains engage the front sprockets at the bicycle pedal crank and the rear sprockets at the rear wheel hub for transmitting the pedaling force from the pedal crank to the rear wheel hub. As shown in Japanese Utility Model Application No. 6-49955, typical bicycle chains comprise first and second outer link plates, first and second inner link plates disposed between the first and second outer link plates so that a portion of the first outer link plate overlaps a portion of the first inner link plate and a portion of the second outer link plate overlaps a portion of the second inner link plate, a connecting pin that extends through the portion of the first outer link plate that overlaps the portion of the first inner link plate and through the portion of the second outer link plate that overlaps the portion of the second inner link plate to connect the first and second outer link plates to the first and second inner link plate, and a roller surrounding the connecting pin between the first and second inner link plates. The connecting pin has an intermediate part and first and second ends, wherein recesses are formed at the tips of the first and second ends. The first and second ends are crimped to form expanded parts that engage the outer surfaces of the first and second outer link plates. The recesses formed at the tips of the first and second ends make it easier to form the expanded parts when the first and second ends are crimped to the outer plates.

To adjust the chain length, a chain connecting pin extracting tool is used to extract the connecting pin and thereby separate the links. A typical chain connecting pin extracting tool comprises a pin extractor in the form of a push pin that is moved back and forth by a screw, and a positioning jig that engages and positions a chain link so that the connecting pin aligns with the pin extractor. The screw advances the pin extractor to push the connecting pin out of the chain while the chain is supported by the jig. At that time, the expanded part of the connecting pin at the end pushed by the pin extractor breaks off in the form of a ring, and the connecting pin is pushed out of the chain. After the chain length has been adjusted, a special replacement connecting pin is pushed into the chain to reconnect the end links.

When pushing the connecting pin out of a conventional chain, the outer link plates can become deformed as the expanded part breaks. This can be attributed to excessive force on the outer link plates when the expanded part is broken. If the outer link plates become deformed in this manner, the replacement connecting pin may not be held properly at the deformed outer plate when the chain links are reconnected, thus resulting in the danger of a weakly connected chain.

SUMMARY OF THE INVENTION

The present invention is directed to various features of an apparatus for connecting bicycle chain links together. In one embodiment, a bicycle chain connecting pin comprises a pin body dimensioned to fit within an opening in a link plate of a bicycle chain, wherein the pin body has an intermediate part and first and second ends. At least one of the first and second ends has a corresponding first or second recess defining a floor that faces in a longitudinal direction of the pin away from the pin. The floor has a floor diameter of from approximately 60% to approximately 90% of an outer diameter of the intermediate part. Additional inventive features will become apparent from the description below, and such features may be combined with the above features to provide additional benefits.

DETAILED DESCRIPTION OF THE EMBODIMENTS

Figure 1:
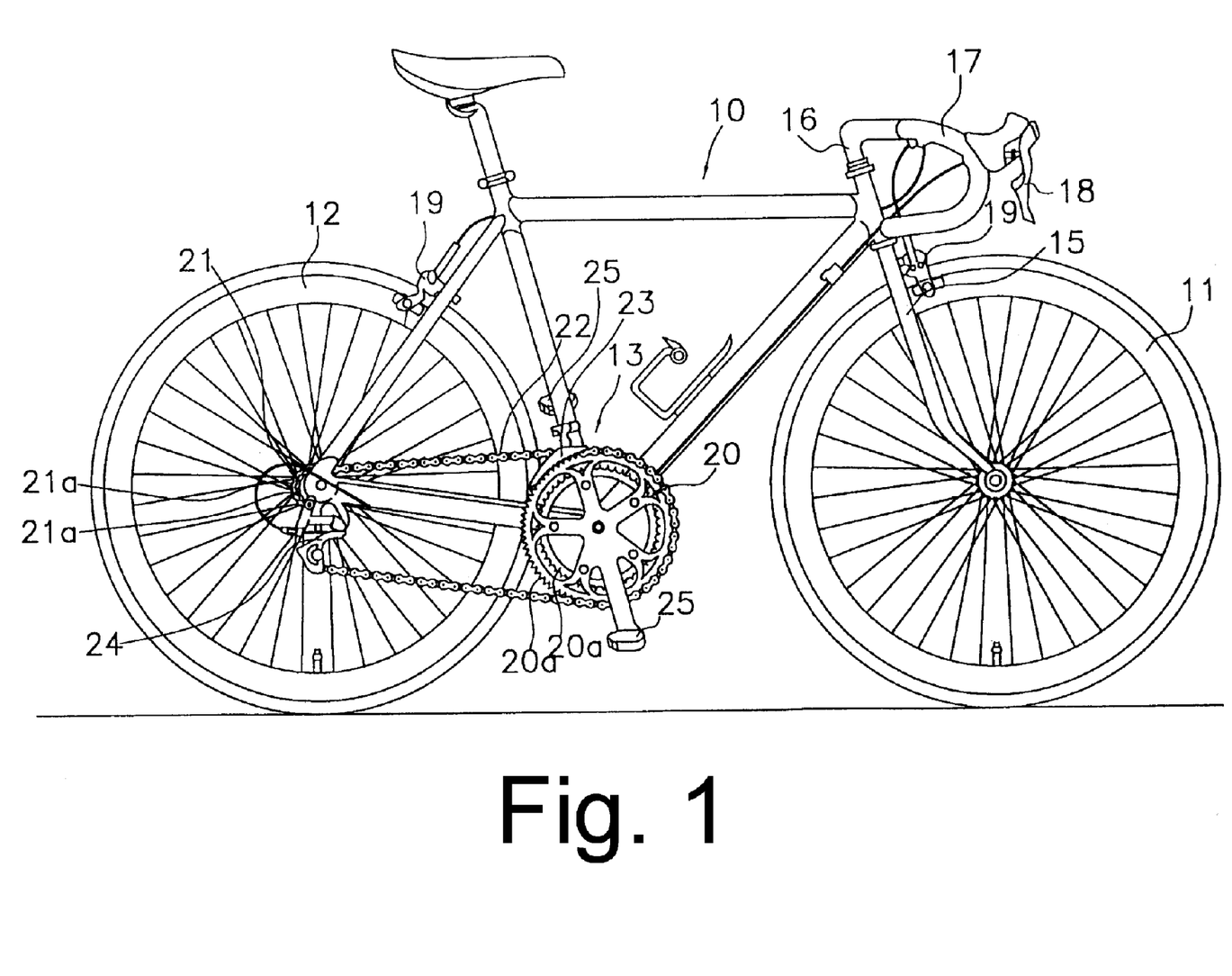
FIG. 1 is a side view of a particular embodiment of a bicycle.
Figure 2:
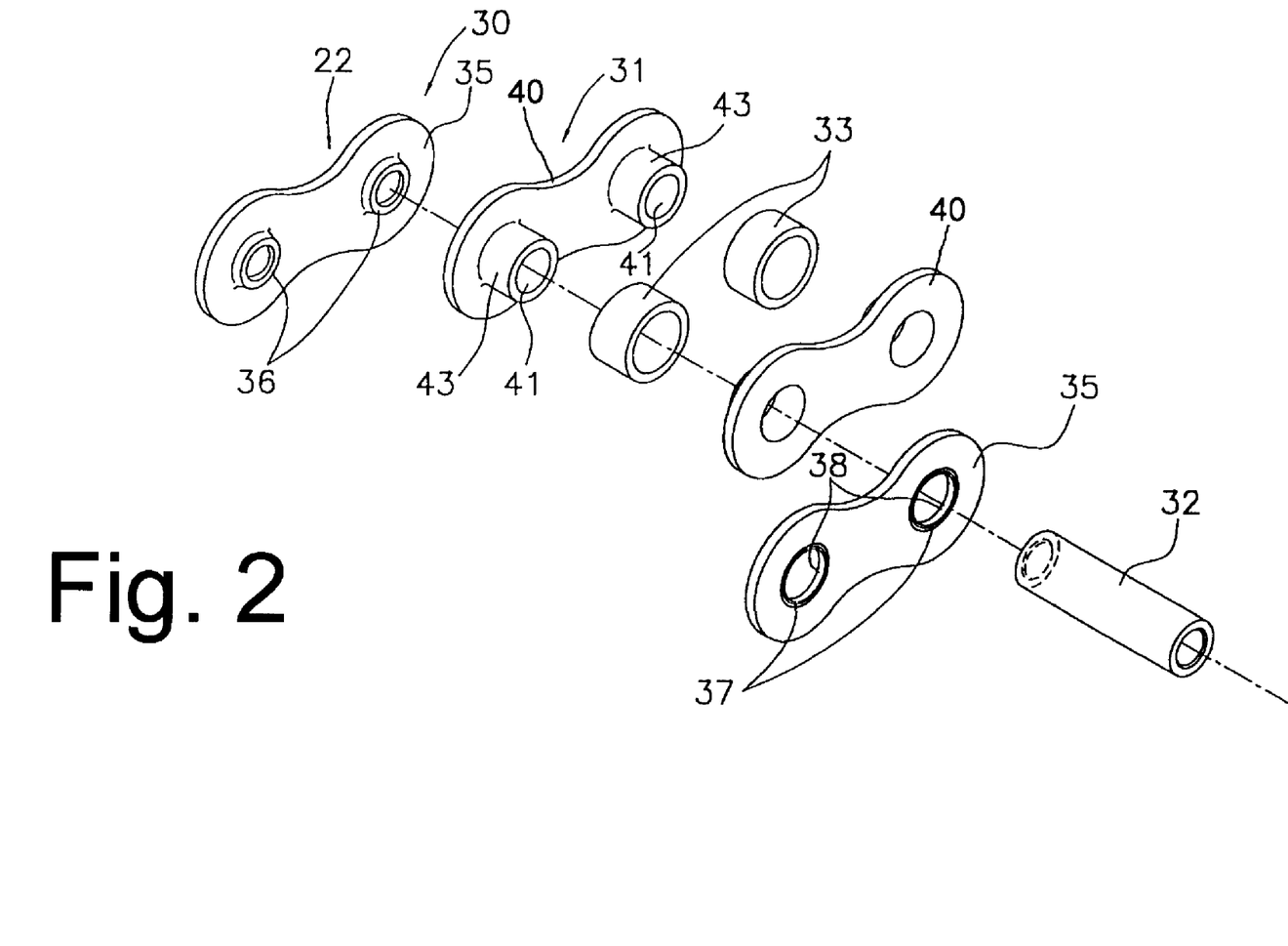
FIG. 2 is an exploded view of a particular embodiment of bicycle chain links and a connecting pin.
Figure 3:
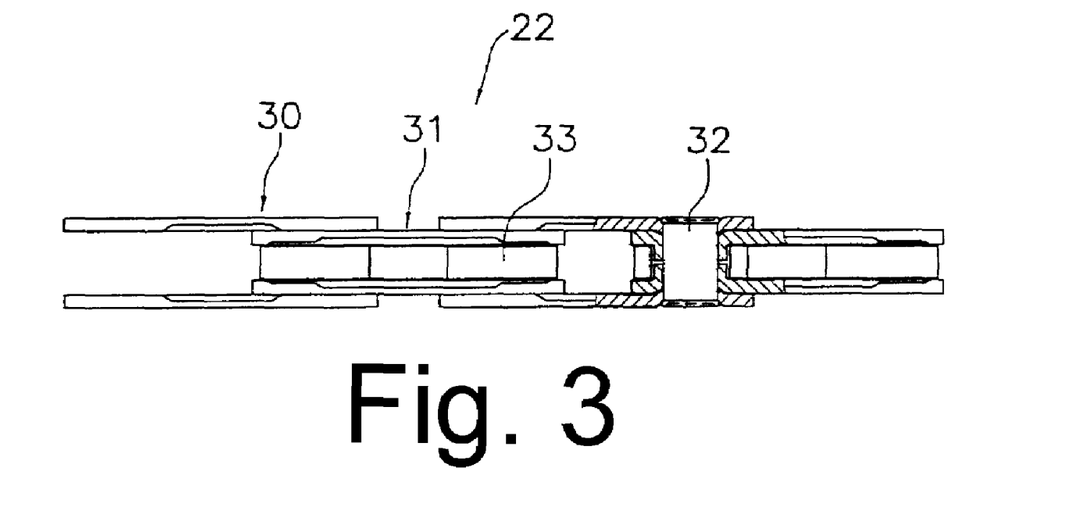
FIG. 3 is a top view of a portion of a particular embodiment of a bicycle chain.
Figure 4:
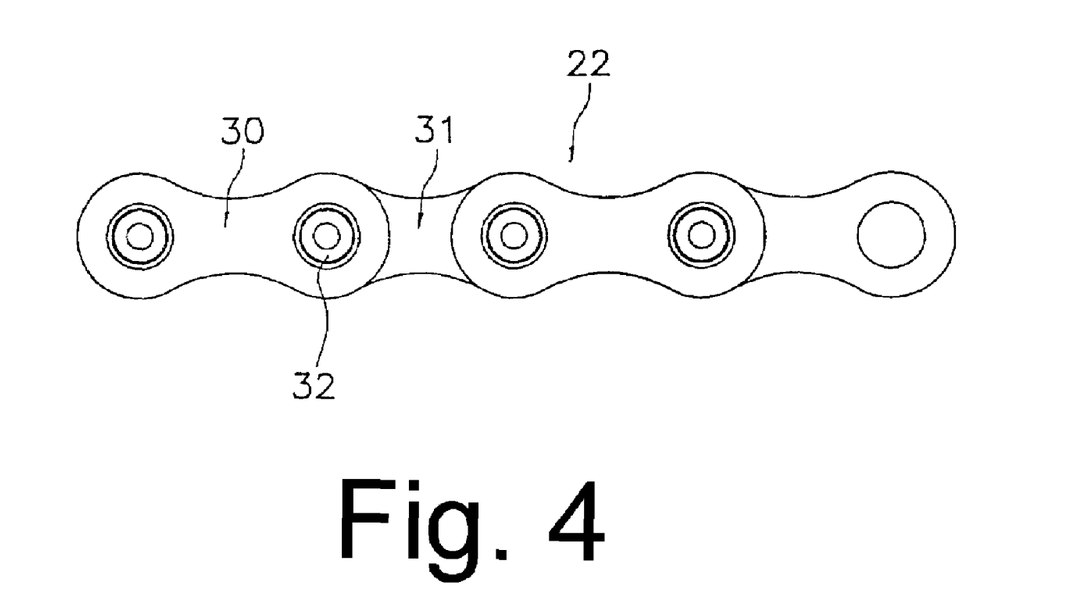
FIG. 4 is a side view of the bicycle chain shown in FIG. 3.

FIG. 1 is a side view of a particular embodiment of a road bicycle 1. Bicycle 1 comprises a diamond-shaped frame 10, a front fork 15 rotatably mounted to the front portion of frame 10, a front wheel 11 rotatably mounted to the lower part of fork 15, a rear wheel 12 rotatably mounted to the rear of frame 10, and a drive mechanism 13 for driving rear wheel 12. A handlebar stem 16 is mounted to the upper part of fork 15, and a drop-style handlebar 17 is mounted to a front end of handlebar stem 16. Front and rear brake lever assemblies 18 with integrated shifting mechanisms are mounted to opposite sides of handlebar 17. Front and rear brake lever assemblies 18 control respective front and rear brake mechanisms 19 for braking front wheel 11 and rear wheel 12.

Drive unit 13 comprises a pedal crank 20 with a pair of front sprockets 20a and a pair pf pedals 25 rotatably mounted to the lower middle part of frame 10, a rear sprocket assembly 21 having a plurality of, e.g., ten rear sprockets 21a, a chain 22 that selectively engages one of the plurality of front sprockets 20a and one of the plurality of rear sprockets 21a, a front derailleur 23 for switching chain 22 among the plurality of front sprockets 20a, and a rear derailleur 24 that switches chain 22a among the plurality of rear sprockets 21a. In this embodiment, the spacing of the plurality of rear sprockets 21a is approximately 6 mm, for example, which is somewhat less than the spacing of conventional rear sprocket assemblies with seven or eight rear sprockets.

As shown in FIGS. 2-6, chain 22 comprises outer links 30, inner links 31 that alternate with outer links 30, connecting pins 32 that connect the outer links 30 to the inner links 31, and a roller 33 surrounding each connecting pin 32 for rotating around the longitudinal axis of its corresponding connecting pin 32. Each outer link 30 comprises a pair of spaced apart outer link plates 35 oriented to face each other. Each outer link plate 35 is formed in the shape of a gourd that is round at both ends by punching a steel sheet having a thickness Ti of approximately 0.8 to approximately 1.0 mm. In this embodiment, an interval D between the outer surfaces of the pair of outer link plates 35 ranges from approximately 5.5 to approximately 6.2 mm, and preferably approximately 5.7 to approximately 6.0 mm. A dish-shaped tapered first recess 36 extends inwardly from the outer surface of each outer link plate 35, a concave second recess 37 extends inwardly from each first recess 36, and a first insertion through hole 38 extends inwardly from each second recess, wherein each first through hole 38 has a smaller diameter than a side wall of its corresponding second recess 37. First recesses 36 may be formed by embossing using a punch press, for example, to a depth of approximately 0.2 mm to approximately 0.3 mm. Second recesses 37 and first insertion through holes 38 may be formed simultaneously by punching with a punch press. Each second recess 37 is formed into a flange, with a crease in the form of an angled part 37a (FIG. 6) having a distinct vertex formed between it and its corresponding first insertion through hole 38. First recess 36 and second recess 37 are formed such that the thickness of the outer link plate 35 at the first insertion hole 38 is at least approximately 70% of the thickness T1.

Each inner link 31 comprises a pair of spaced apart inner link plates 40 oriented to face each other. The end of each inner link plate 40 is disposed inside a corresponding end of an outer link plate 35 such that each end of an outer link plate 35 overlaps an end of a corresponding inner link plate 40. Each inner link plate 40 is formed in the shape of a gourd that is round at both ends by punching a steel sheet having a thickness T2 of from approximately 0.75 to approximately 0.95 mm. An inwardly extending tubular part 43 is formed at each end of each inner plate 40 so that corresponding pairs of the tubular parts 43 face each other with a slight gap. Rollers 33 are disposed on the outer periphery of the facing tubular parts 43 between each pair of inner link plates 40 so as to rotate about the axis of its corresponding connecting pin 32. The inner peripheral surface of each tubular part 43 defines a second insertion through hole 41 having a diameter greater than the diameter of its corresponding connecting pin 32 and first insertion through holes 38. In this embodiment, the diameter of second through hole 41 is from approximately 0.2 mm to approximately 0.5 mm greater than the diameter of connecting pin 32. This makes it easier to insert connecting pin 32 through second insertion through holes 41. Tubular parts 43 may be formed by a drawing process, for example. A rounded outer surface 43a is formed at the transition between the main body of each outer link plate 40 and its corresponding tubular part 43 so as not to come into contact with the inwardly extending protrusion formed by first and second recesses 36 and 37.

Each connecting pin 32 comprises a rod-shaped pin body that has undergone a hardening treatment to improve wear resistance. Each connecting pin 32 has a diameter slightly greater than the inner diameter of first insertion through holes 38. For example, each connecting pin may have a diameter of approximately 3.63 mm, for example, such diameter being approximately 0.02 mm to approximately 0.08 mm greater than the inner diameter of first insertion through holes 38. Each connecting pin 32 is pushed through aligned pairs of the first and second insertion through holes 38 and 41 to join corresponding inner and outer links 30 and 31 together. When connecting pin 32 is pressed in, a radially inwardly contracting force as indicated by the arrow in FIG. 6 acts on the outer peripheral surface of connecting pin 32, thus allowing connecting pin 32 to be firmly fixed to the outer link plates 35. Furthermore, each connecting pin 32 has an intermediate part 32a and expanded parts 32b, wherein expanded parts 32b are formed by crimping the end tips of connecting pin 32. The expanded parts 32b engage the angled parts 37a of the second recesses 37 to further axially secure connecting pin 32 to its corresponding outer link 30.

Figure 5:
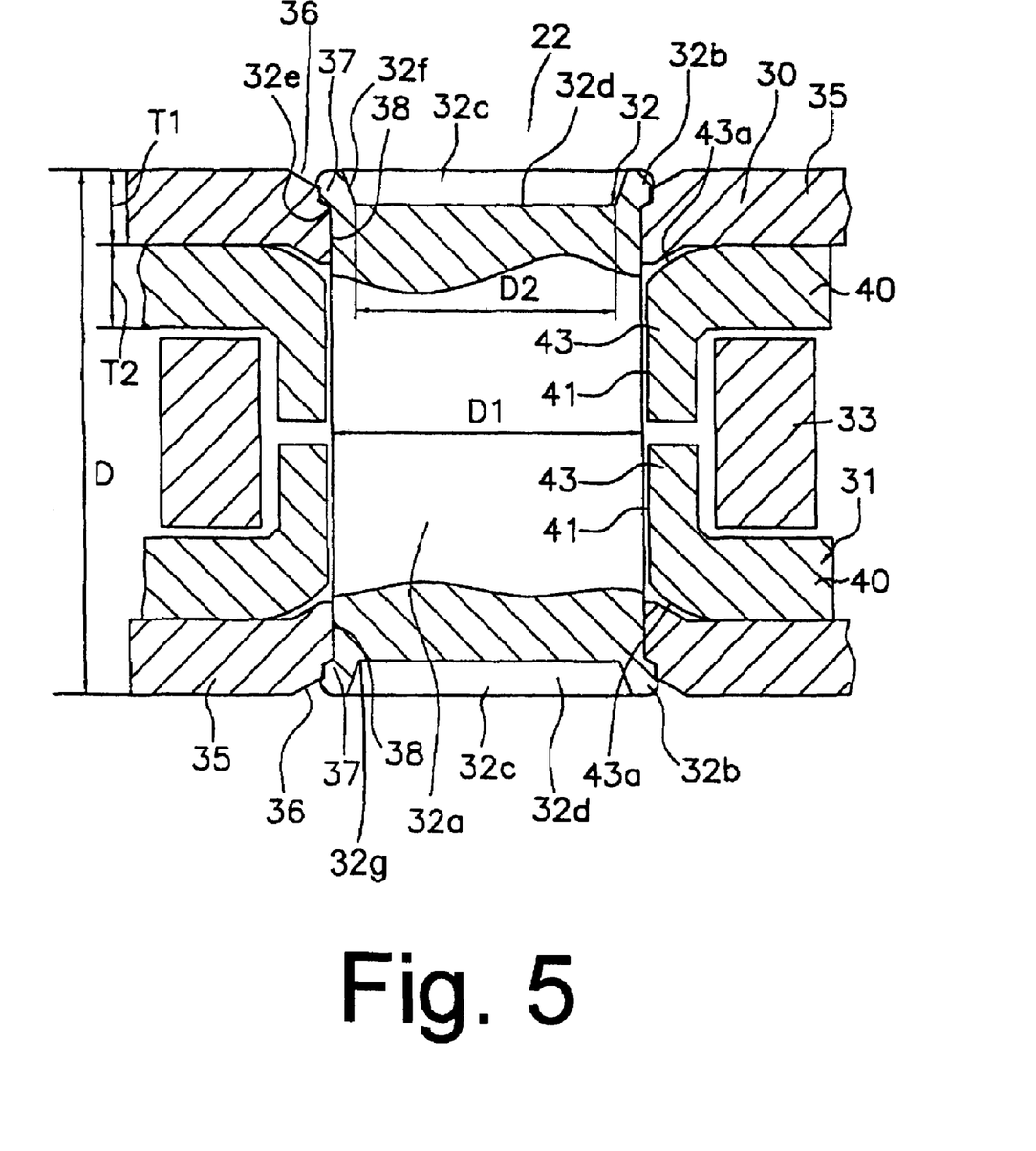
FIG. 5 is a detailed cross sectional view of the bicycle chain in the area of the connecting pin.
Figure 6:
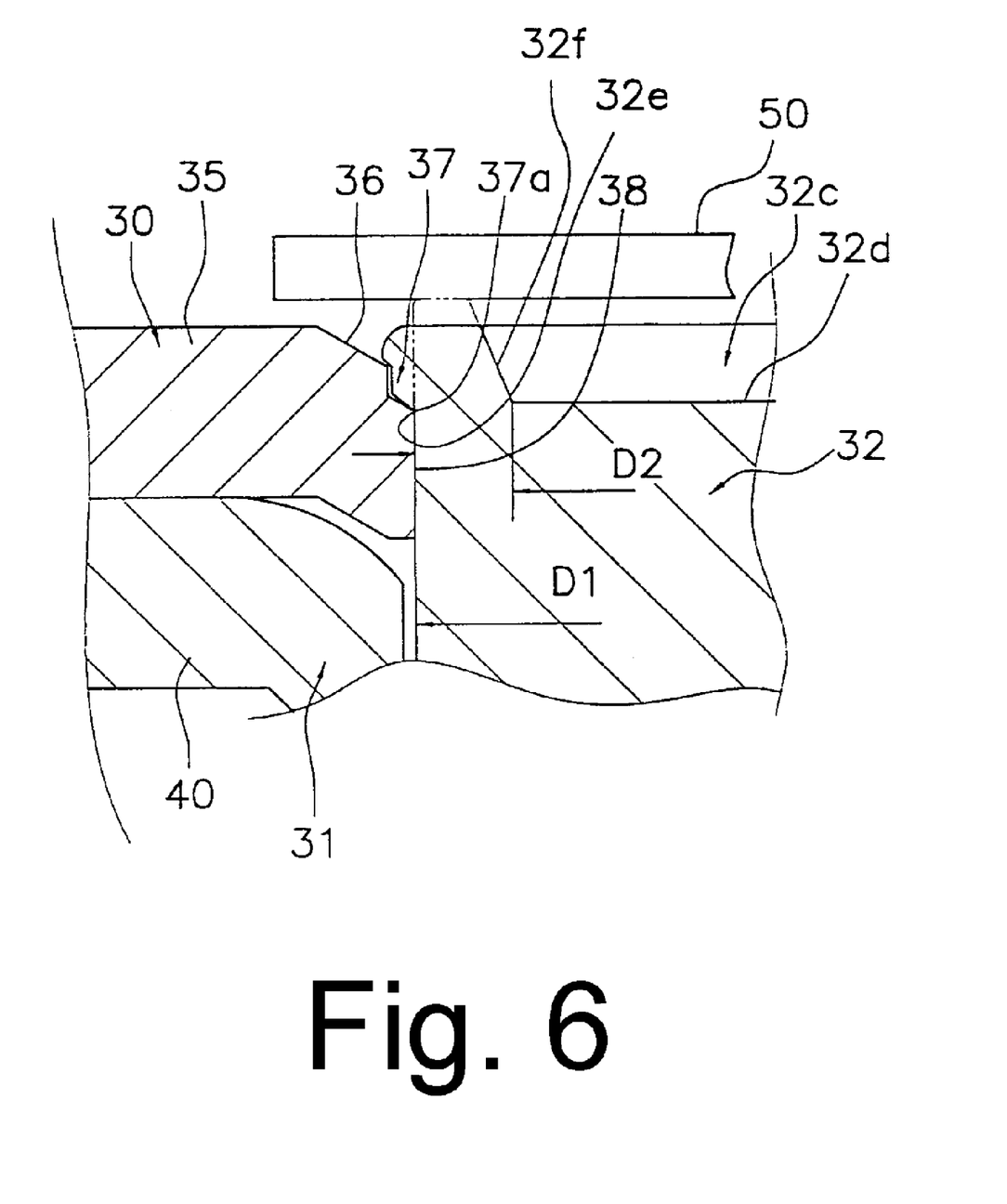
FIG. 6 is a detailed cross sectional view of the bicycle chain at an upper left corner of the connecting pin.

A frusto-conically shaped recess 32c is formed in the center of each end of each connecting pin 32. Each recess has an inner peripheral side surface 32f and a floor 32d that faces in a longitudinal direction of connecting pin 32 away from connecting pin 32. A crease 32g that forms a distinct vertex is formed at the junction between side surface 32f and floor 32d. In this embodiment, side surface 32f and floor 32d have straight surface portions so that crease 32g forms a distinct vertex of an angle. Floor 32d has a floor diameter D2 of from approximately 60% to approximately 90% of an outer diameter D1 of intermediate part 32a and is smaller than the diameter of insertion through holes 38. Preferably, diameter D2 of floor 32d is approximately 70% to approximately 80% of diameter D1 of intermediate part 32b. Furthermore, recess 32c is from approximately 0.35 mm to approximately 0.5 mm deep, preferably 0.42 mm deep. This structure facilitates the shearing of expanded parts 32b by angled parts 37a when connecting pin 32 is removed. As a result, it is less likely that excessive force will act on outer link plate 40 as connecting pin 32 is removed, and it is possible to control the deformation of outer link plate 40 so as to preserve the nodal strength of chain 22. It has been found that, when the aforementioned proportion of diameter D2 to diameter D1 is over 90%, even slight axial force applied to connecting pin 32 creates the risk of shearing off expanded part 32b. On the other hand, a proportion of diameter D2 to diameter D1 less than 60% creates the risk of excessive shearing force, thus resulting in possible deformation of the outer link plate 40.

When the ends of connecting pin 32 are crimped, the annular part surrounding each recess 32c more readily expands in the direction of second recess 37, thus allowing the angled part 32e of expanded part 32b to engage more precisely with angled part 37a of second recess 37. The axial length of the crimped connecting pin 32 is approximately ±0.3 mm relative to the distance D between the outer surfaces of the pair of outer link plates 35. Preferably, connecting pin 32 is crimped in such a way as not to exceed 6 mm.

To assemble chain 22, the tubular parts 43 of each pair of inner link plates 40 are disposed facing each other, and rollers 33 are disposed around the tubular parts 43. Outer link plates 35 are disposed alternating with inner link plates 40 with first insertion through holes 38 aligning with second insertion through holes 41. Connecting pins 32 then are pushed into a first insertion through hole 38, through the corresponding second insertion through hole 41, and then through the other first insertion through hole 38 so that both ends of connecting pin 32 protrude from second recesses 37. Both ends of connecting pins 32 are crimped using a crimping tool 50 in the form of a flat plate, for example, to form expanded parts 32b, and the angled parts 32e of expanded parts 32b engaged the angled parts 37a of second recesses 37.

Figure 7:
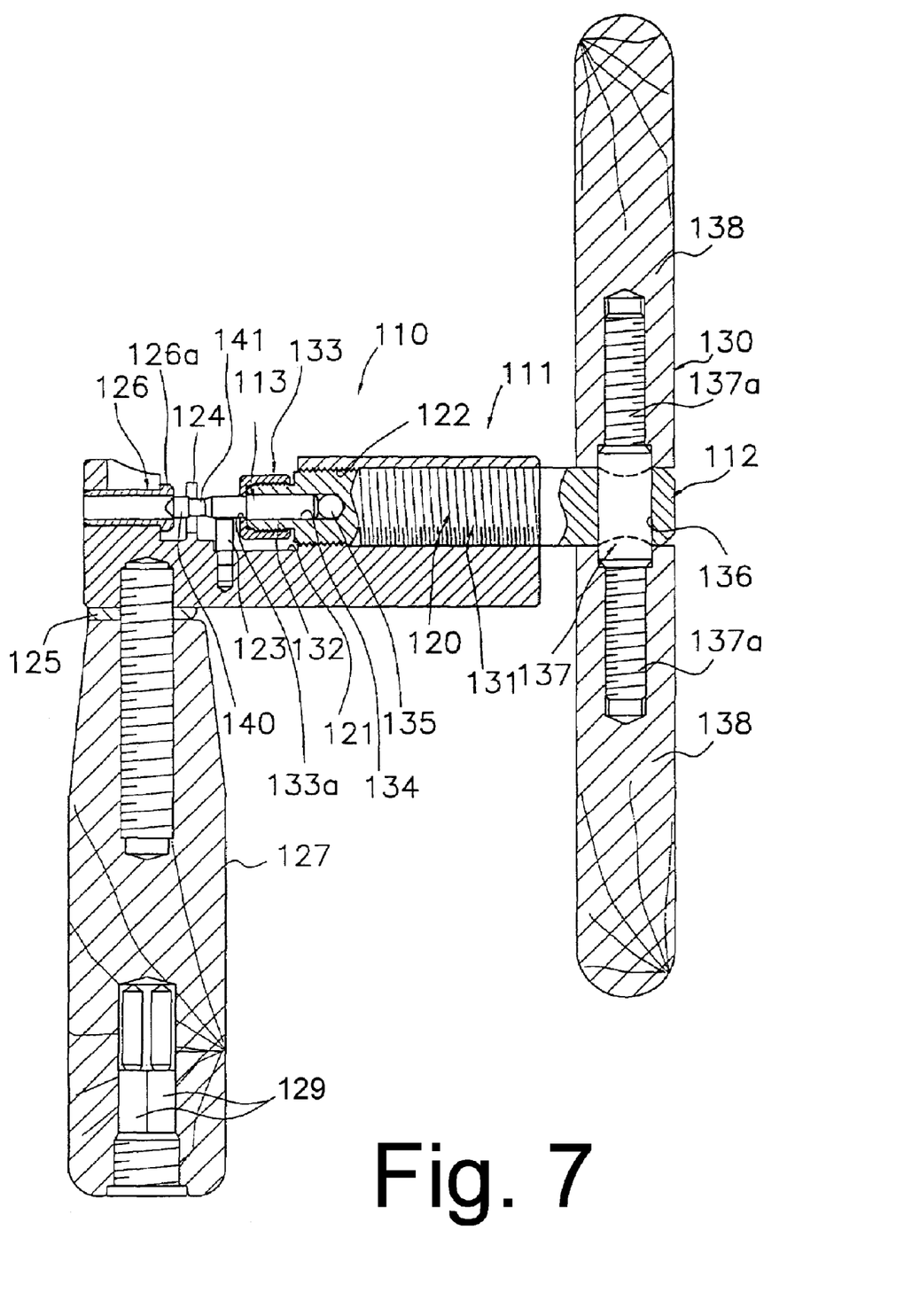
FIG. 7 is a cross sectional view of a particular embodiment of a connecting pin extracting tool.

FIG. 7 is a cross sectional view of a particular embodiment of a chain connecting pin extracting tool 110 that may be used to remove any one of the connecting pins 32. As shown in FIG. 7, chain connecting pin extracting tool 110 comprises a main body 111, a pin extractor support in the form of a force applying unit 112 including a shaft 120 with a male threaded component 131 that screws into a female threaded component 122 formed in main body 111, and a pin extractor 113 connected to the tip of shaft 120. A wooden grip 127 is screwed into the longitudinal side of main body 111, and a storage space is formed in grip 127 for storing two connecting pins 129, one of which may be used to replace connecting pin 32 after connecting pin 32 has been removed from chain 22.

Main body 111 is a generally hexagonal-shaped cylindrical member with a mounting recess 121 formed therein. A support pin 123 is mounted in mounting recess 121 for supporting pin extractor 113, and a plurality of positioning protrusions 124 are disposed in mounting recess 121 for positioning chain 22 during the extraction operation. Positioning protrusions 124 are formed in the same shape as the teeth of the sprockets engaged by chain 22 and are oriented such that, when chain 22 is positioned on positioning protrusions 124, connecting pin 32 aligns with pin extractor 113. A link support in the form of a positioning bracket 125 with a bushing 126 having a flanged tip 126a is provided for restricting axial movement of the outer links 30 of chain 22 as connecting pin 32 is pushed by pin extractor 113. Bushing 126 has a through hole with a diameter large enough to receive connecting pin 32 therein. The top of bushing 126 and the corresponding top part of positioning bracket 125 are open to allow the extracted connecting pin 32 to be removed.

An extractor attachment component 132 having a smaller diameter than the male threaded component 131 of shaft 120 is formed at the inner tip of shaft 120, and a cylindrical holder 133 for detachably mounting pin extractor 113 is screwed onto extractor attachment component 132. An engagement hole 133a for engaging pin extractor 113 is formed in the bottom of holder 133, and a mounting hole 134 for mounting pin extractor 113 is formed in the center of extractor attachment component 132. Pin extractor 113 comprises a tip 140 and an integrally formed base 141, wherein tip 140 is smaller in diameter than connecting pin 32 and shorter than connecting pin 32. Base 141 is smaller in diameter than tip 140, at least at the border with tip 140.

A hand grip 130 is mounted to the outer end of shaft 120 through a mounting shaft 137 that extends through a handle attachment hole 136 formed diametrically through the outer end of shaft 120. Hand grip 130 includes two wooden grips 138 with female threaded components that engage male threaded components 137a formed on opposite ends of mounting shaft 137. Rotation of hand grip 130 causes pin extractor 113 to move in a direction of a pin extractor axis defined by the longitudinal direction of pin extractor 113. The pin extractor axis is generally coaxial with a connecting pin axis that is defined by the longitudinal direction of connecting pin 32 when chain 22 is positioned for removal of connecting pin 32.

A steel ball bearing 135 is mounted in the bottom of mounting hole 134 so that pin extractor 113 is rotatable relative to shaft 120. Thus, when the tip of pin extractor 113 contacts connecting pin 32 and hand grip 130 is rotated, pin extractor 113 rotates relative to connecting pin 32 until the contact force becomes large, and then pin extractor 113 rotates relative to shaft 120 to avoid any drilling effect on connecting pin 32. The rotation of pin extractor 113 relative to shaft 120 also allows pin extractor 113 to be firmly positioned on connecting pin 32 during the extraction operation.

Figure 8A:
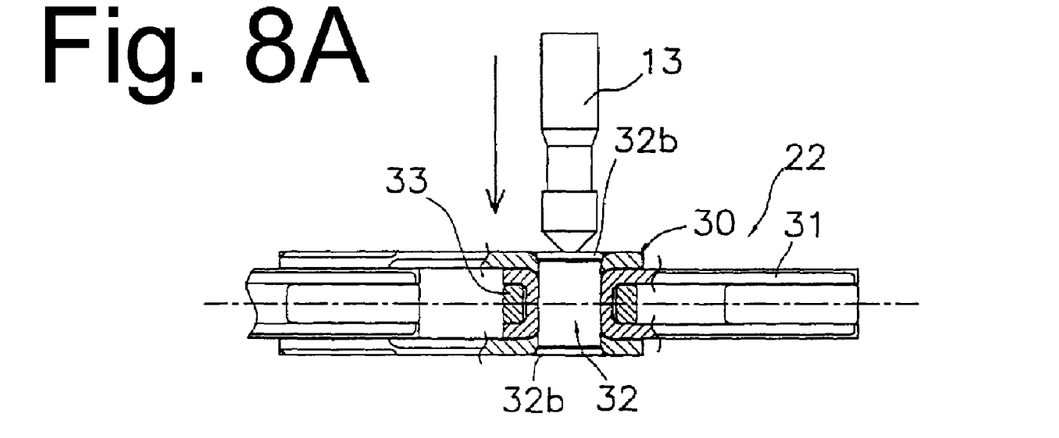
FIGS. 8A-8C illustrate the removal of a connecting pin using the connecting pin extracting tool.
Figure 8B:
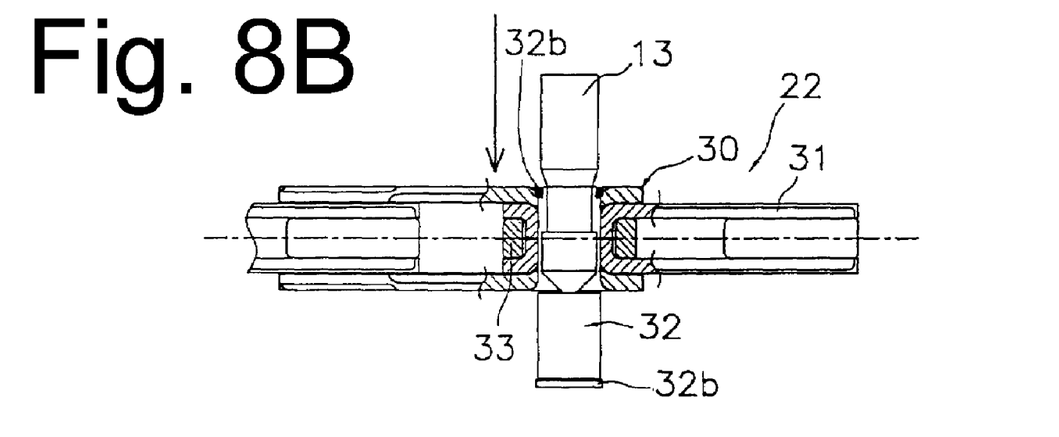
Figure 8C:
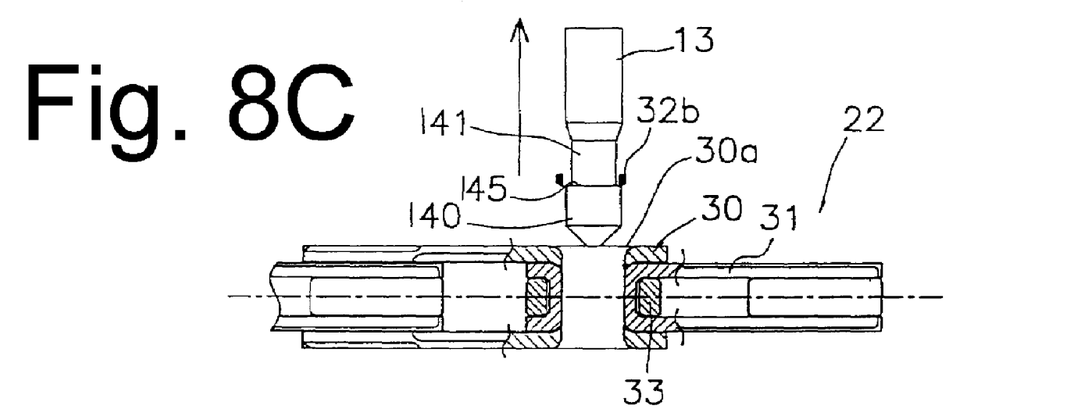

The operation of chain connecting pin extracting tool 110 is shown in FIGS. 8A-8C. Initially, hand grip 130 is rotated counterclockwise (when facing hand grip 130) to retract pin extractor 113 sufficiently to allow chain 22 to be positioned in mounting recess 121. Chain 22 then is mounted on positioning protrusions 124 so that the connecting pin 32 to be extracted faces pin extractor 113. When hand grip 130 is rotated clockwise, pin extractor 113 advances until the free end of tip 140 contacts connecting pin 32 as shown in FIG. 8A. The flanged tip 126a of bushing 126 simultaneously prevents the corresponding outer link 30 from moving in the pushed direction indicated by the arrow in FIG. 8A.

Further rotation of hand grip 130 causes pin extractor 113 to push connecting pin 32 out of the opposite side of chain 22 as shown in FIG. 8B. At this time, the expanded part 32b of connecting pin 32 adjacent to tip 140 breaks off and remains in the second recess 37. If expanded part 32b is left in that position, it will obstruct the positioning of the new spare pin 129 and prevent the spare pin 129 from being mounted properly. Ho as shown in FIG. 8C, when hand grip 130 is rotated in the counterclockwise direction to retract pin extractor 113 after connecting pin 32 has been removed, the broken expanded part 32b is caught by an abutment 145 formed at the junction of tip 140 and base 141 of pin extractor 113, thus allowing the broken expanded part 32b to be removed from second recess 37.

Since the diameter D2 of floor 32d in recess 32c is larger than recesses found in conventional connecting pins, the expanded part 32b, which conventionally was broken at the end (top) surface and angled part when sheared off, is now sheared off around the angled part 32e and the inner peripheral surface 32f of recess 32c, thus requiring weaker shearing force. The forces acting on outer link plate 35 are thus weaker, with less likelihood of deformation or damage of outer link plate 35 when connecting pin 32 is removed, thereby preserving the nodal strength of chain 22.

While the above is a description of various embodiments of inventive features, further modifications may be employed without departing from the spirit and scope of the present invention. For example, while tubular parts 43 were formed on the inner link plates 40, and rollers 33 were disposed on the tubular parts 43, rollers 33 may be directly placed around connecting pins 32 without forming such tubular parts 43. While recesses 32c were formed concavely in the form of a dish, recesses 32c may have any shape. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:
1. A bicycle chain apparatus comprising:
first and second outer link plates;
wherein the first outer link plate includes:
    a first recess that extends inwardly from an outer surface of the first link plate;
    a second recess that extends inwardly from the first recess;
    an insertion through hole that extends inwardly from the second recess;
    a first angled part with a distinct vertex formed only by the first outer link plate,
wherein the first angled part is disposed between the first recess and the second recess; and
    a second angled part with a distinct vertex formed only by the first outer link plate, wherein the second angled part is disposed between the second recess and the insertion through hole;
first and second inner link plates disposed between the first and second outer link plates so that a portion of the first outer link plate overlaps a portion of the first inner link plate and a portion of the second outer link plate that includes the insertion through hole overlaps a portion of the second inner link plate;

a connecting pin that extends through the insertion through hole formed in the portion of the first outer link plate that overlaps the portion of the first inner link plate and through the portion of the second outer link plate that overlaps the portion of the second inner link plate to connect the first and second outer link plates to the first and second inner link plates; and wherein the connecting pin has a pin body that has an intermediate part and first and second ends, wherein at least one of the first or second ends has a corresponding first or second recess defining a floor that faces in a longitudinal direction of the pin away from the pin, and wherein the floor has a floor diameter of from approximately 60% to approximately 90% of an outer diameter of the intermediate part.

2. The apparatus according to claim 1 wherein the floor diameter is from approximately 70% to approximately 80% of the outer diameter of the intermediate part.

3. The apparatus according to claim 1 wherein an axial length of the connecting pin is less than or equal to a distance between outer surfaces of the first and second outer link plates.

4. The apparatus according to claim 1 wherein the first inner link plate has a first tubular portion that extends toward the second inner link plate, and wherein the second inner link plate has a second tubular portion that extends toward and faces the first tubular portion.

5. The apparatus according to claim 4 wherein the connecting pin extends through the first and second tubular portions.

6. The apparatus according to claim 5 further comprising a roller that surrounds the first and second tubular portions.

7. The apparatus according to claim 6 wherein the pin body has a diametrically expanded part at the at least one of the first or second recess of the pin body to engage an outer surface of its corresponding first or second outer link plate.

8. The apparatus according to claim 7 wherein the expanded part completely surrounds the at least one of the first or second recess of the pin body.

9. The apparatus according to claim 1 wherein the first end has the corresponding first recess, and wherein the second end has the corresponding second recess.

10. The apparatus according to claim 9 wherein the first recess of the pin body defines a first floor that faces in the longitudinal direction of the pin away from the pin, wherein the first floor has a first floor diameter of from approximately 60% to approximately 90% of the outer diameter of the intermediate part, wherein the second recess of the pin body defines a second floor that faces in the longitudinal direction of the pin away from the pin, and wherein the second floor has a second floor diameter of from approximately 60% to approximately 90% of the outer diameter of the intermediate part.

11. The apparatus according to claim 10 wherein the pin body has a first diametrically expanded part that completely surrounds the first recess of the pin body to engage an outer surface of the first link plate, wherein the pin body has a second diametrically expanded part that completely surrounds the second recess of the pin body to engage an outer surface of the second link plate, wherein the first floor diameter is from approximately 70% to approximately 80% of the outer diameter of the intermediate part, and wherein the second floor diameter is from approximately 70% to approximately 80% of the outer diameter of the intermediate part.

12. The apparatus according to claim 1 wherein the first angled part forms a distinct vertex of an angle, and wherein only an outer surface of the first outer link plate forms the vertex of the first angled part.

13. The apparatus according to claim 12 wherein the second angled part forms a distinct vertex of an angle, and wherein only an outer surface of the first outer link plate forms the vertex of the second angled part.

* * * * *